US009776069B2

(12) United States Patent
Mckay (10) Patent No.: US 9,776,069 B2
(45) Date of Patent: Oct. 3, 2017

(54) STROLLER-ATTACHABLE SKATEBOARD APPARATUS

(71) Applicant: Travis Mckay, Redondo Beach, CA (US)

(72) Inventor: Travis Mckay, Redondo Beach, CA (US)

( * ) Notice: Subject to any disclaimer, the term of this patent is extended or adjusted under 35 U.S.C. 154(b) by 0 days.

(21) Appl. No.: 14/687,897

(22) Filed: Apr. 15, 2015

(65) Prior Publication Data

US 2016/0303467 A1    Oct. 20, 2016

(51) Int. Cl.
*A63C 17/26* (2006.01)
*A63C 17/00* (2006.01)
*B62B 7/06* (2006.01)
*A63C 17/01* (2006.01)

(52) U.S. Cl.
CPC .......... *A63C 17/26* (2013.01); *A63C 17/0006* (2013.01); *A63C 17/013* (2013.01); *A63C 17/016* (2013.01); *B62B 7/06* (2013.01); *A63C 17/015* (2013.01)

(58) Field of Classification Search
CPC ......... A63C 1/26; A63C 1/0006; A63C 1/015; A63C 1/016; A63C 1/017; B62B 7/06; B62B 9/12; B62B 9/28; B62B 2205/104; B62B 2207/00; B62B 2301/05;
(Continued)

(56) References Cited

U.S. PATENT DOCUMENTS 3,000,645 A * 9/1961 Schmidt .................... B62B 9/28
280/203
3,834,726 A 9/1974 Hobza
(Continued)

FOREIGN PATENT DOCUMENTS

CN    2626818 Y    7/2004
CN    201291892 Y    8/2009
(Continued)

OTHER PUBLICATIONS

Sound Percussion Labs SPH05 Adjustable L-Rod Ball Mount, as shown on Amazon.com.

*Primary Examiner* — J. Allen Shriver, II
*Assistant Examiner* — Steve Clemmons
(74) *Attorney, Agent, or Firm* — Lance M. Pritikin (57) ABSTRACT

A stroller-attachable skateboard apparatus comprises a skateboard, a connection rod and and an adjustable mounting bracket. The connection rod includes a board engagement portion, a stroller engagement portion and a rod axis. A rod securement interface of the skateboard receives the board engagement portion and rigidly retains it therein by way of an actuatable locking pin such that the rod axis extends laterally of the skateboard's longitudinal axis. The stroller engagement portion is axially receivable by a rod receiving element and releasably axially locked therein by way of a first spring-biased actuator element. The rod receiving element may be provided as part of the adjustable mounting bracket or as a pre-existing wheel axle end from which a stroller wheel has been removed. The mounting bracket facilitates highly-adjustable mounting of the skateboard to a frame member of a standard, unmodified stroller. The connection rod may also be adjusted for extension length.

12 Claims, 5 Drawing Sheets

(58) Field of Classification Search
CPC ..... B62B 5/0016; B62B 3/1444; F16B 21/16; F16B 21/13; F16B 21/06
See application file for complete search history.

(56) References Cited

U.S. PATENT DOCUMENTS

| | | | | |
|---|---|---|---|---|
| 4,477,121 | A * | 10/1984 | Atkins | B60B 27/02 301/112 |
| 5,522,121 | A * | 6/1996 | Fraynd | B62B 9/00 24/335 |
| 6,422,634 | B2 * | 7/2002 | Lundh | B62B 5/00 280/32.7 |
| 6,540,238 | B2 | 4/2003 | Yang | |
| 6,827,356 | B2 | 12/2004 | Zhuang | |
| 6,851,693 | B2 * | 2/2005 | Haeggberg | B62B 9/28 280/204 |
| 7,581,737 | B2 * | 9/2009 | Cousin | B62B 9/28 280/32.7 |
| 7,677,585 | B2 * | 3/2010 | Rohl | B62B 9/28 280/203 |
| 8,029,007 | B2 * | 10/2011 | Jones | B62D 63/00 280/204 |
| 8,128,103 | B1 * | 3/2012 | Schutzendorf | B62B 7/008 280/33.993 |
| 8,500,139 | B1 | 8/2013 | Andrews et al. | |
| 8,622,357 | B2 * | 1/2014 | Youngblood | A45C 13/28 248/276.1 |
| 8,714,582 | B2 * | 5/2014 | Hei | B62B 9/28 280/47.35 |
| 9,193,368 | B2 * | 11/2015 | Shapiro | B62B 3/02 |
| 9,402,774 | B1 * | 8/2016 | Martin | A61G 5/10 |
| 9,469,328 | B2 * | 10/2016 | Love | B62B 19/02 |
| 2001/0004785 | A1 * | 6/2001 | Lundh | B60B 33/045 16/43 |
| 2001/0033069 | A1 * | 10/2001 | Ivers | B62B 9/28 280/648 |
| 2007/0090619 | A1 * | 4/2007 | Lundh | B62B 9/12 280/63 |
| 2011/0017564 | A1 | 1/2011 | Fan | |
| 2012/0217720 | A1 | 8/2012 | Lai | |

FOREIGN PATENT DOCUMENTS

| | | | | |
|---|---|---|---|---|
| CN | 204110118 U | | 1/2015 | |
| EP | 0918011 A1 | | 5/1999 | |
| GB | 2311261 A | * | 9/1997 | ............... B62B 9/28 |
| GB | 2328907 A | * | 3/1999 | ............... B62B 9/28 |
| GB | 2518675 A | * | 4/2015 | ............... B62B 51/02 |
| SE | WO 9322179 A1 | * | 11/1993 | ............... B62B 9/28 |

* cited by examiner

STROLLER-ATTACHABLE SKATEBOARD APPARATUS

RELATED APPLICATIONS

Not Applicable.

TECHNICAL FIELD

The present invention relates generally to auxiliary wheeled devices for attachment to strollers. More particularly, the present invention relates to portable stroller-attachable wheeled platforms for supporting additional riders.

BACKGROUND

Prior expedients for attaching a wheeled board, such as a skateboard, to a stroller have been previously proposed. What is needed is an improved stroller-attachable skateboard apparatus which allows the skateboard to be more easily and adjustably attached to a wider variety existing strollers.

SUMMARY

Certain deficiencies of the prior art are overcome by the provision of embodiments of a stroller-attachable skateboard apparatus in accordance with the present invention. An exemplary such apparatus may comprise a skateboard, a connection rod, and an adjustable bracket.

The skateboard may include a board element, a pair of front wheels, a pair of rear wheels, a wheelbase defined therebetween, and a rod securement interface. The board element has a longitudinal axis extending lengthwise along the skateboard, from front to back. The rod securement interface may include an actuatable locking pin.

The connection rod may include a board engagement portion, a stroller engagement portion and a rod axis extending therebetween. The connection rod has a secured configuration in which the rod securement interface is in rigid retention of the board engagement portion such that the rod axis extends generally laterally of the longitudinal axis. The connection rod element is typically disposed within the wheel base when in its secured configuration. The stroller engagement portion is axially receivable by a rod receiving element and releasably axially locked therein by way of engagement between a first detent of the stroller engagement portion and a first spring-biased actuator element of the rod receiving element. The rigid retention of the board engagement portion may be by way of engagement between the actuatable locking pin and the board engagement portion. The board engagement portion includes one or more second annular grooves axially spaced from one another. The locking pin is generally configured to selectably engage any of the second annular grooves, thereby adjustably setting the distance between the stroller engagement portion and the longitudinal axis. Also, the connection rod may be selectively placed in secured configuration such that it extends from the left side or the right side of the skateboard.

An adjustable bracket may be provided. The bracket typically includes a clamp element, an aforementioned rod receiving element, and an extension arm therebetween. The bracket element is adapted to clampingly attach to a frame member of a stroller by way of the clamp element. Embodiments of the present invention may be adapted such that the aforementioned rod receiving element is a pre-existing wheel axle end of a stroller, a respective stroller wheel having been removed from the wheel axle end.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Referring now to the drawings, like reference numerals designate identical or corresponding features throughout the several views.

Described herein are certain non-limiting embodiments of a stroller-attachable skateboard apparatus 100. Referring to FIGS. 1-5 for illustration, a stroller-attachable skateboard apparatus may comprise a skateboard 102 and a connection rod element 118. A skateboard 102 may preferably include a board element 104, one or more front wheels 106, one or more rear wheels 108, and a rod securement interface 110. The board element 104 may preferably have a board front end 112, a board rear end 114 and a longitudinal axis 116 extending therebetween.

A connection rod element 118 may preferably include a board engagement portion 120, a stroller engagement portion 122 and a rod axis 124 extending therebetween. The connection rod element 118 may have a secured configuration in which the rod securement interface 110 is in rigid retention of the board engagement portion 120 such that the rod axis 124 extends laterally of the longitudinal axis 116. In preferred embodiments, such lateral extension is substantially perpendicular to the longitudinal axis 116. In certain alternative embodiments, the extension angle between the rod axis and the longitudinal axis may be between, for example, 60-90 degrees. The stroller engagement portion 122 is preferably axially receivable by a rod receiving element 126 and releasably axially locked therein by way of a first detent 128 of the stroller engagement portion 122. The aforementioned rigid retention may preferably still allow the connection rod element to rotate about its rod axis 124. However, such rigid retention would typically prevent the connection rod element from being axially removed from the rod securement interface, or rotated with respect to the longitudinal axis of the skateboard.

Figure 12:
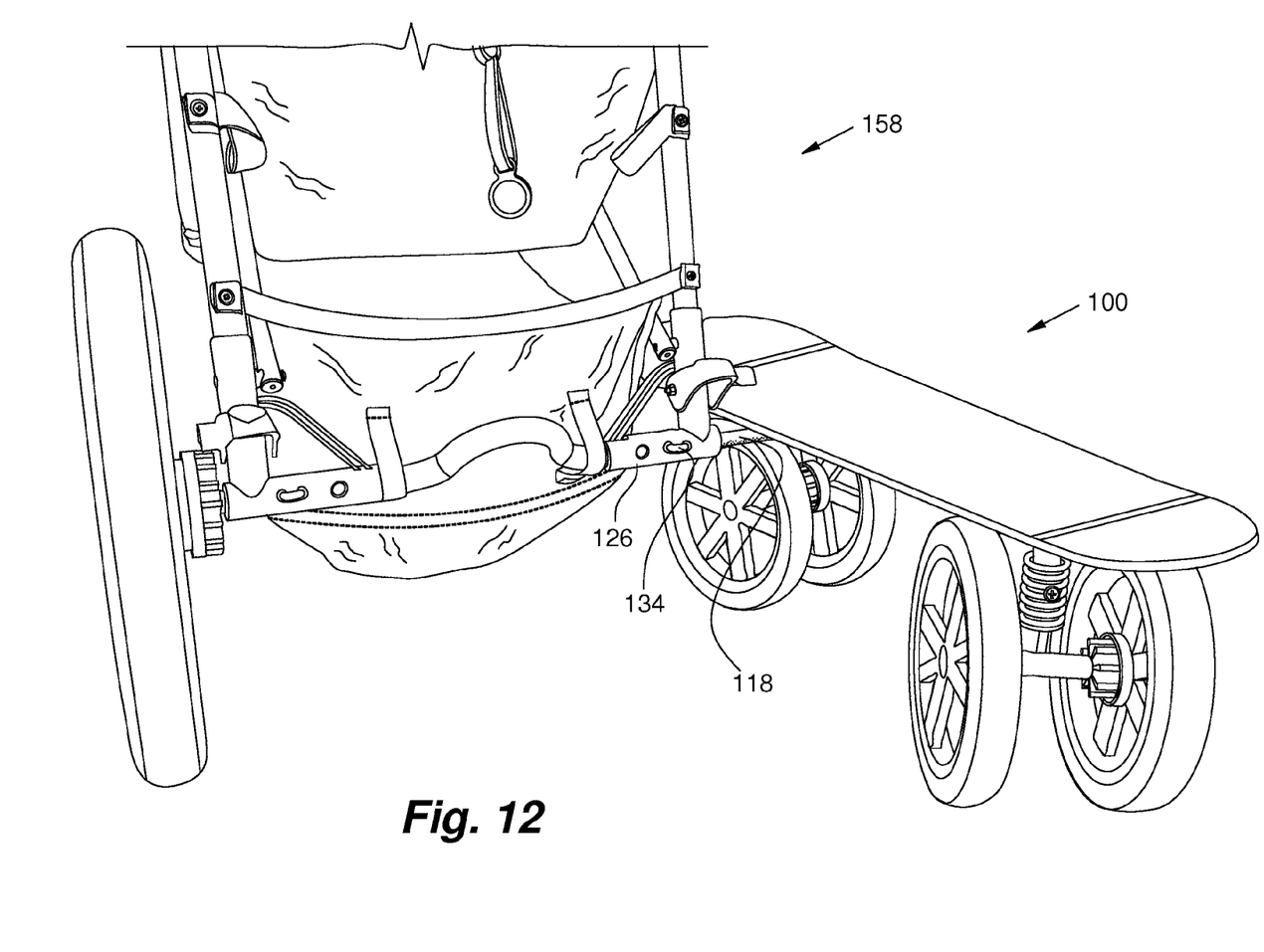
FIG. 12 is a diagrammatic perspective view of an alternate implementation of an apparatus in accordance with the present invention, wherein the rod receiving element is a pre-existing wheel axle end of the stroller, a respective stroller wheel has been removed from the wheel axle end, and the skateboard and connection rod element support the entire weight of the stroller which would have been supported by the replaced stroller wheel.

Referring to FIG. 12, in one implementation of an apparatus in accordance with the present invention, the rod receiving element 126 is a pre-existing wheel axle end of the stroller 158, a respective stroller wheel having been removed from the wheel axle end 126. Although FIG. 12 does not depict the removed stroller wheel, such wheel would be largely or entirely identical to the remaining stroller wheel shown on the opposing side of the stroller 158. The implementation shown in FIG. 12 is particularly applicable to jogging-type strollers with rapidly axially-removable rear wheels.

Figure 5:
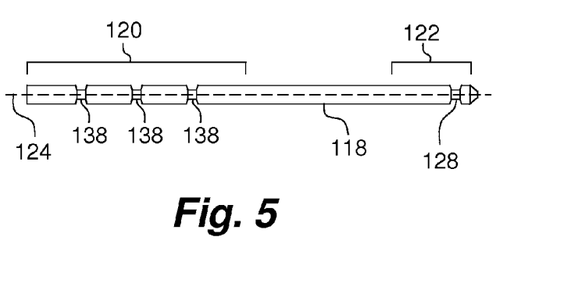
FIG. 5 is a side view of one example embodiment of a connection rod element in accordance with the present invention.
Figures 6, 7, 8, 9:
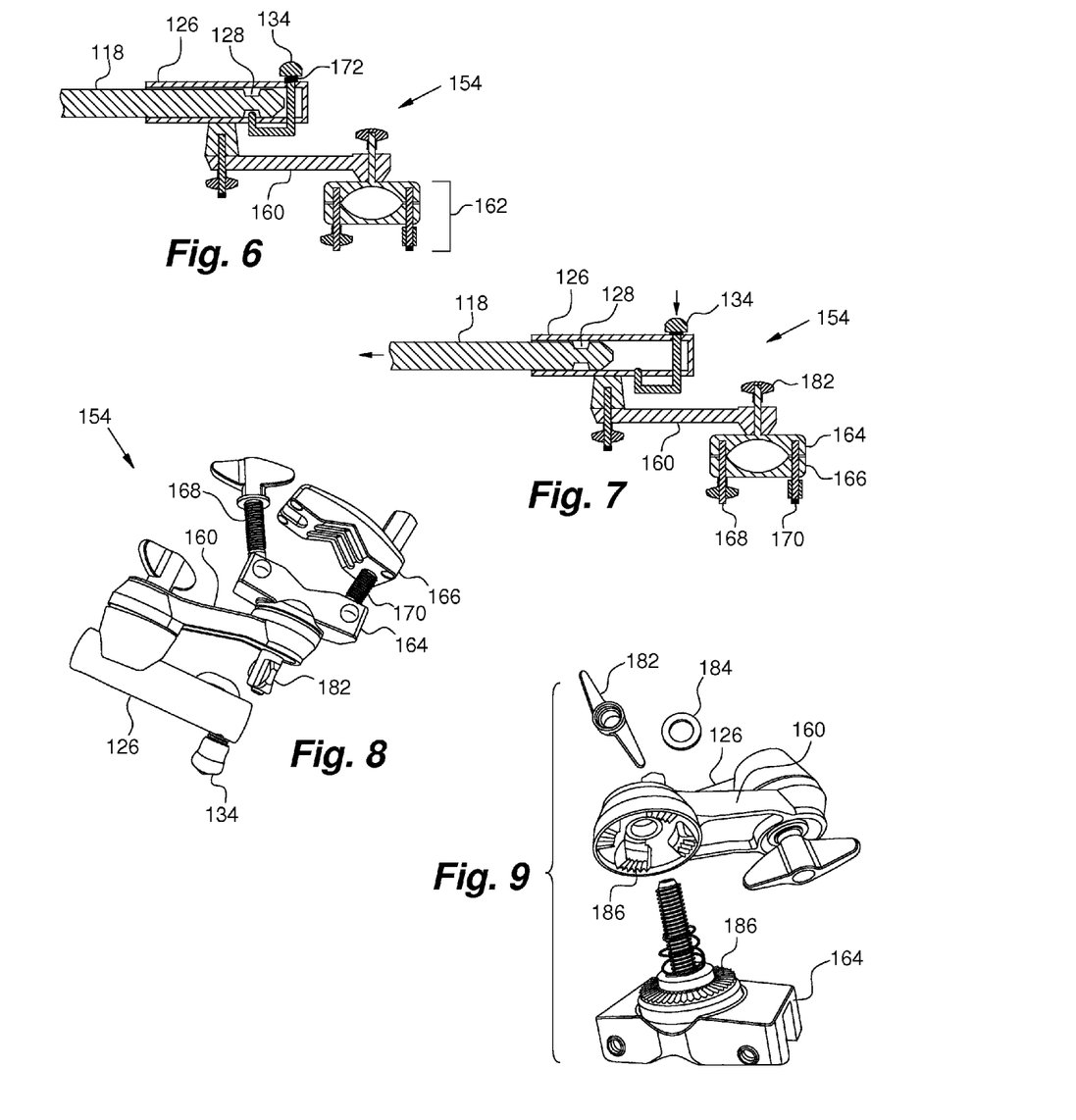
FIG. 6 is a diagrammatic cross-sectional view of detail 6 in FIG. 4, showing the connection rod element axially locked in a rod receiving element by way of engagement between a first detent portion of the connection rod element and a first spring-biased actuator element.
FIG. 7 is a diagrammatic cross-sectional view similar to that of FIG. 6, but showing the first spring biased actuator element in an unlocking configuration, and the connection rod element resultingly being axially released and removable from the rod receiving element.
FIG. 8 is a diagrammatic perspective view of one example of an adjustable bracket element in accordance with the present invention, showing the first clamp fastener pivoted with respect to the first jaw member so as to be laterally removed from the second jaw member.
FIG. 9 is a diagrammatic perspective view of a portion of a bracket element in a partially disassembled state, illustrating example mechanisms which facilitate the rotatable adjustability between a clamp element and an extension arm of the bracket element.
Figure 10:
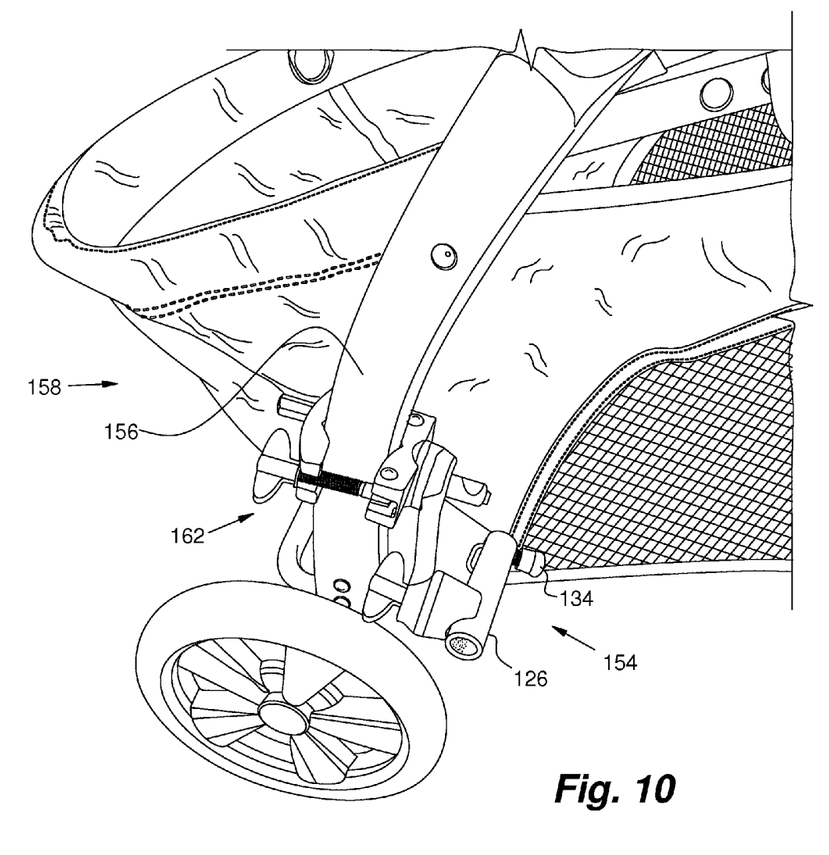
FIG. 10 is a diagrammatic partial perspective view of a bracket element clampingly attached to a frame member of a stroller.
Figure 11:
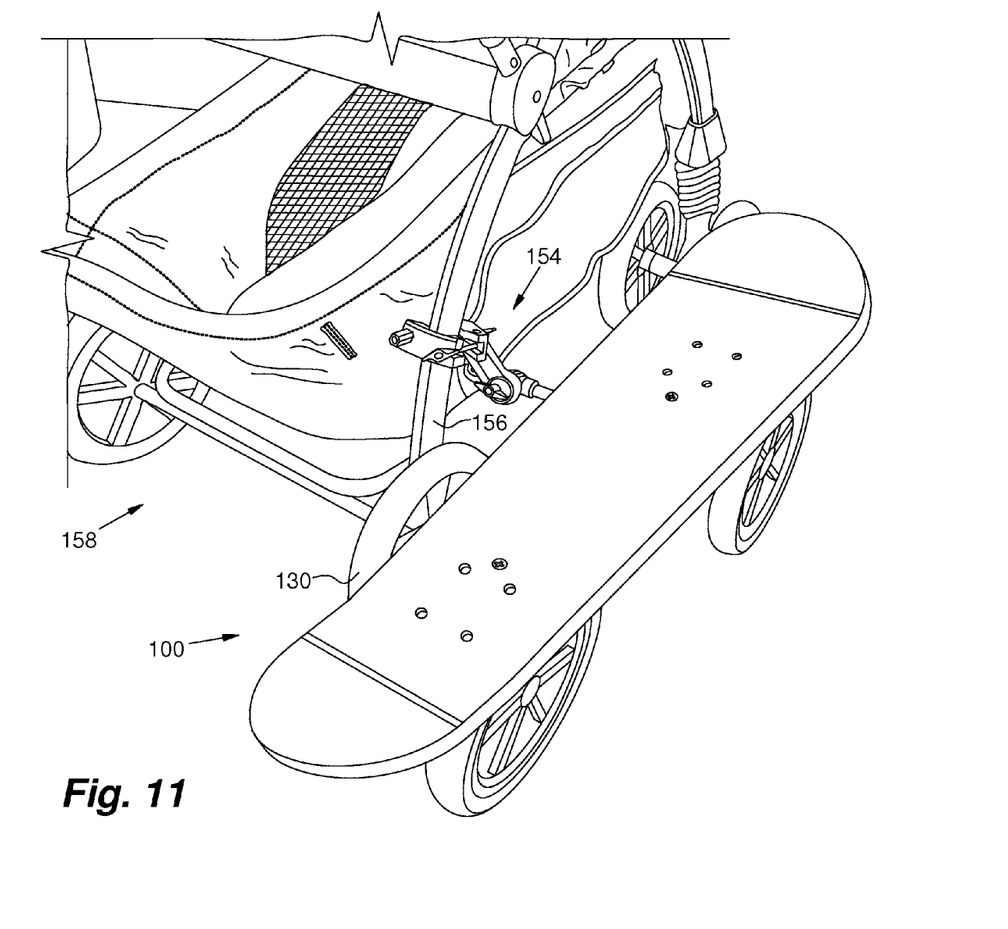
FIG. 11 is a diagrammatic perspective view illustrating one implementation of an example apparatus in accordance with the present invention, wherein the skateboard is securely and adjustably attached to a frame member of a stroller by way of a connection rod element and bracket element.

As illustrated in FIGS. 5-7, in certain preferred embodiments, the first detent 128 may be a first annular groove formed in the connection rod element 118. In such embodiments, for example, the releasable axial locking of the stroller engagement portion 122 within the rod receiving element 126 may preferably be achieved by way of a first spring-biased actuator element 134 of the rod receiving element 126. Such spring bias may be provided by a compression spring 172, or the like. As illustrated in FIG. 7, actuation of the actuator element 134 unlocks the stroller engagement portion 122, and allows the connection rod element to be easily axially removed from the rod receiving element 126.

Figures 1, 2, 3:
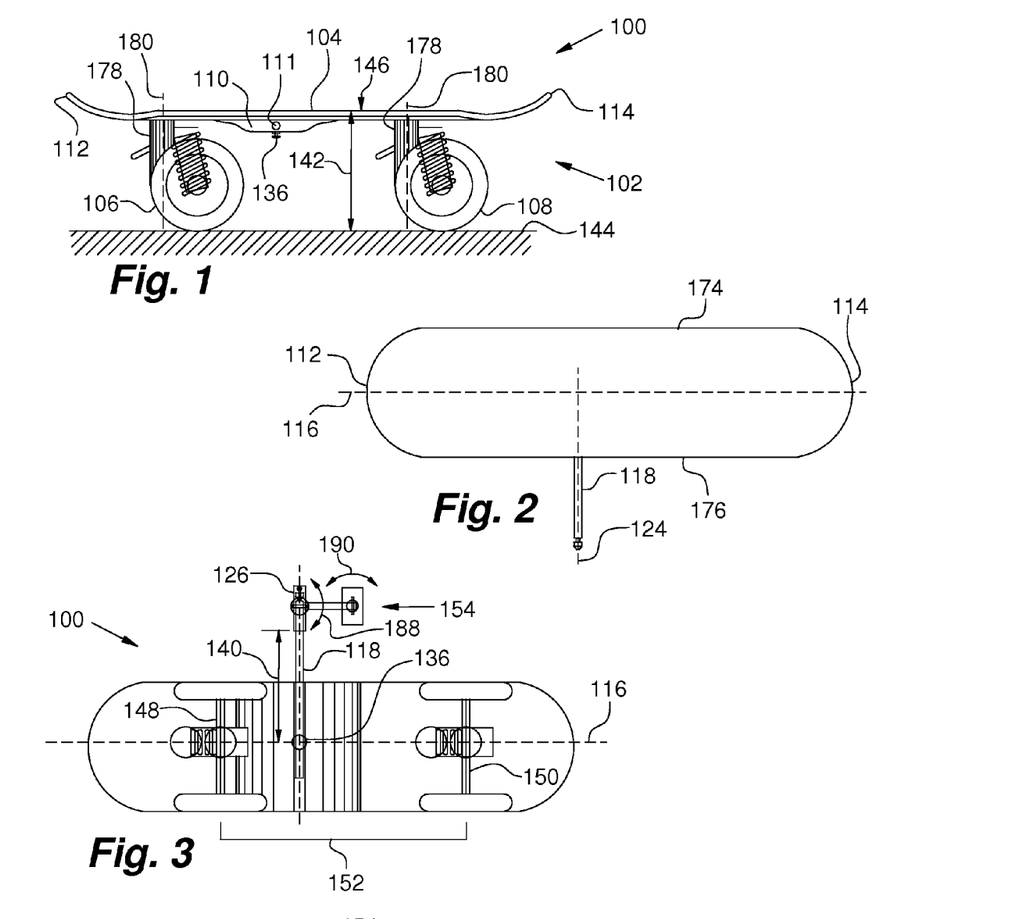
FIG. 1 is a diagrammatic side view of a skateboard in accordance with one example embodiment of the present invention.
FIG. 2 is a diagrammatic top view of the skateboard shown in FIG. 1, and a connection rod element retained by a board engagement portion of the skateboard, thereby forming one embodiment of an apparatus in accordance with the present invention.
FIG. 3 is a diagrammatic bottom view of an apparatus similar to that shown in FIG. 2, but also including an adjustable bracket element attached to the connection rod element.
Figure 4:
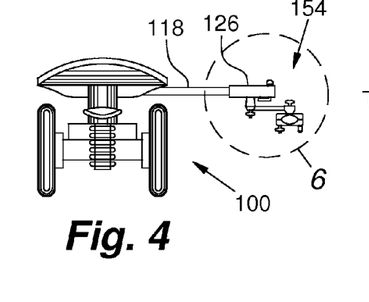
FIG. 4 is a diagrammatic front view of the embodiment of an apparatus shown in FIG. 3.

In particular embodiments of an apparatus 100, such as the one illustrated in FIGS. 1 and 3, the rod securement interface 110 may include a locking pin 136. In such embodiments, the rigid retention of the board engagement portion 122 by the rod securement interface 110 may occur by way of engagement between the locking pin and the board engagement portion 120. Such engagement may be similar to what is depicted in FIG. 6 between the actuator 134 and first detent 128. For example, the locking pin 136 may be a second spring-biased actuator element, and the board engagement portion 120 may include a multiplicity of second annular grooves 138 axially spaced from one another. Referring to FIGS. 3 and 5 for illustration, in such embodiments, the locking pin 136 may be configured to selectably engage any of the second annular grooves 138, thereby adjustably setting the distance 140 between the stroller engagement portion 122 and the longitudinal axis 116. Moreover, in preferred embodiments, the connection rod element 118 may be selectively placed in its secured configuration such that it extends from the right side 174 or the left side 176 of the skateboard.

Referring again to FIG. 1, in certain embodiments of an apparatus 100, the skateboard 102 may include a height 142 defined by the distance between the ground surface 144 on which the wheels 106 and 108 are placed and an upper surface 146 of the board element 104. This height 142 may be adjustable by way of selective extension and refraction of the wheels 106 and 108 from the board element 104. Such adjustability may be facilitated by way of adjustable height sockets 178, or the like.

With reference to FIG. 3, in particular embodiments, the skateboard 102 may include two front wheels 106 connected by a front axle 148, two rear wheels 108 connected by a rear axle 150, and each of the front and rear axles may be swivelably attached to the board element 104. Referring to FIG. 1, such swiveling may occur about respective swivel axes 180.

Referring to FIG. 3, in embodiments, a wheelbase 152 is typically defined between the one or more front wheels 106 and the one or more back wheels 108. The connection rod element 118 is preferably disposed within the wheel base when in its secured configuration. In particular, this helps ensure that any stroller weight carried by the apparatus 100 is sufficiently distributed between the front a rear wheels, thereby also preventing the skateboard from undesirably rotating about the rod axis 124 as such stroller weigh is applied.

As illustrated in FIGS. 3, 4, 10 and 11, certain preferred embodiments of an apparatus 100 further comprise a bracket element 154. The bracket element may be used to attach an embodiment of the apparatus 100 to a standard (e.g., non-jogging) stroller without requiring the removal of one of the pre-existing stroller wheels. Such a bracket element 154 may include the aforementioned rod receiving element 126 and may be clampingly attachable to a frame member 156 of the stroller 158. Referring to FIGS. 6-9 for a depiction of one or more preferred embodiments of a bracket element 154, the bracket element 154 may include an extension arm 160 disposed between the rod receiving element 126 and a clamp element 162. Moreover, the rod receiving element 126 and clamp element 162 may be rotatably adjustably fastened to the extension arm 160. Such an embodiment would provide the bracket element 154 at least two separate locations of multi-directional rotational adjustability, as illustrated for example at 188 and 190 of FIG. 3.

In particular embodiments with a bracket element 154, the clamp element 162 may include a first jaw member 164, a second jaw member 166, a first clamp fastener 168 and a second clamp fastener 170. As illustrated in FIG. 8, the first clamp fastener 168 may be pivotably affixed to the first jaw member 164 and laterally insertable and removable from the second jaw member 166. Such capability allows the clamp element 162 to be initially placed around and eventually removed from a frame member 156 of a stroller 158.

FIG. 9 depicts a portion of an example bracket element 154 in a partially disassembled state, illustrating some potential mechanisms facilitating the rotatable adjustability between a clamp element and an extension arm of the bracket element. Such mechanisms may include complimentary teeth 186 or the like, which restrict rotation of the respective components (e.g., 160 and 164) with respect to one another when a wingnut 182 and washer 184 (or the like) are tightened onto the threaded shank of the opposing component. Those of ordinary skill in the art, with the benefit of this disclosure, would understand how to provide alternative but equivalent means of facilitating such rotational adjustability.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A stroller-attachable skateboard apparatus comprising:
   a skateboard including a board element, one or more front wheels, one or more rear wheels, and a rod securement interface, said board element having a board front end, a board rear end and a longitudinal axis extending therebetween; and
   a connection rod element including a board engagement portion, a stroller engagement portion and a rod axis extending therebetween, said connection rod element having a secured configuration in which said rod securement interface is in rigid retention of said board engagement portion such that said rod axis extends laterally of said longitudinal axis;
   wherein
   (a) said stroller engagement portion is configured to be
      (i) axially received by a rod receiving element which is a pre-existing wheel axle end of a stroller from which a pre-existing stroller wheel has been removed, and
      (ii) releasably axially locked within said rod receiving element by way of a first detent of said stroller engagement portion, and
   (b) said skateboard and said connection rod element are configured to
      (a) replace said pre-existing stroller wheel removed from said pre-existing wheel axle end, and
      (b) support the weight of the stroller which would have been supported by said replaced stroller wheel.

2. An apparatus as defined in claim 1 wherein said first detent is a first annular groove in said connection rod element, said releasable axial locking being achieved by way of a first spring-biased actuator element of said rod receiving element.

3. An apparatus as defined in claim 1 wherein said rod securement interface includes a locking pin, said rigid retention of said board engagement portion being by way of engagement between said locking pin and said board engagement portion.

4. An apparatus as defined in claim 3 wherein said locking pin is a spring-biased actuator element.

5. An apparatus as defined in claim 3 wherein said board engagement portion includes a multiplicity of annular grooves axially spaced from one another, said locking pin being configured to selectably engage any of said annular grooves, thereby adjustably setting the distance between said stroller engagement portion and said longitudinal axis.

6. An apparatus as defined in claim 1 wherein said skateboard includes a height defined by a distance between the ground surface on which said wheels are placed and an upper surface of said board element, said height being adjustable by way of selective extension and retraction of said wheels from said board element.

7. An apparatus as defined in claim 1 wherein said skateboard includes two front wheels connected by a front axle, two rear wheels connected by a rear axle, each of said front and rear axles being swivelably attached to said board element.

8. An apparatus as defined in claim 1 wherein a wheelbase is defined between said one or more front wheels and said one or more back wheels, said connection rod element being disposed within said wheel base when in said secured configuration.

9. A stroller-attachable skateboard apparatus comprising:
   a skateboard including a board element, one or more front wheels, one or more rear wheels, a wheelbase being defined therebetween, and a rod securement interface, said board element having a board front end, a board rear end and a longitudinal axis extending therebetween, said rod securement interface including a locking pin; and
   a connection rod element including a board engagement portion, a stroller engagement portion and a rod axis extending therebetween, said connection rod element having a secured configuration in which said rod securement interface is in rigid retention of said board engagement portion such that said rod axis extends laterally of said longitudinal axis, said connection rod element being disposed within said wheel base when in said secured configuration, said stroller engagement portion configured to be axially receivable by, and releasably axially locked within, a rod receiving element which comprises a first end engaging the stroller engagement portion and a second end engaging a stroller wheel,
   wherein said stroller engagement portion is configured to be locked within said rod receiving element by way of engagement between a first detent of said stroller engagement portion and a first spring-biased actuator element of said rod receiving element, said rigid retention of said board engagement portion being by way of engagement between said locking pin and said board engagement portion, and
   wherein the skateboard and the connection rod element are configured to replace a stroller wheel and support the weight of the stroller which would have been supported by said replaced stroller wheel.

10. An apparatus as defined in claim 9 wherein said locking pin is a spring-biased actuator element.

11. An apparatus as defined in claim 10 wherein said board engagement portion includes a multiplicity of annular grooves axially spaced from one another, said locking pin being configured to selectably engage any of said annular grooves, thereby adjustably setting the distance between said stroller engagement portion and said longitudinal axis.

12. A stroller-attachable skateboard apparatus comprising:
   a skateboard including a board element, one or more front wheels, one or more rear wheels, a wheelbase being defined therebetween, and a rod securement interface, said board element having a board front end, a board rear end and a longitudinal axis extending therebetween, said rod securement interface including a locking pin, said locking pin being a second spring-biased actuator element;
   a connection rod element including a board engagement portion, a stroller engagement portion and a rod axis extending therebetween, said connection rod element having a secured configuration in which said rod securement interface is in rigid retention of said board engagement portion such that said rod axis extends laterally of said longitudinal axis, said connection rod element being disposed within said wheel base when in said secured configuration, wherein said stroller engagement portion is configured to be locked within a rod receiving element by way of engagement between a first detent of said stroller engagement portion and a first spring-biased actuator element of said rod receiving element, said rigid retention of said board engagement portion being by way of engagement between said locking pin and said board engagement portion, and said board engagement portion including a multiplicity of annular grooves axially spaced from one another, said locking pin being configured to selectably engage any of said annular grooves, thereby adjustably setting the distance between said stroller engagement portion and said longitudinal axis; and a bracket element including a clamp element, said rod receiving element, and an extension arm therebetween, said bracket element being clampingly attachable to a frame member of said stroller by way of said clamp element, wherein the skateboard and the connection rod element are configured to replace a stroller wheel and support the weight of the stroller which would have been supported by said stroller wheel.

* * * * *